United States Patent
Rey

[11] 3,960,103
[45] June 1, 1976

[54] MARINE SKIMMER CRAFT
[76] Inventor: Herbert Rey, Gretenrade 6, 2301 Schonkirchen, Germany
[22] Filed: Apr. 1, 1974
[21] Appl. No.: 456,667

[30] Foreign Application Priority Data
June 4, 1973 Germany............................ 2328293

[52] U.S. Cl. ........................... 115/1 C; 114/66.5 R; 244/2; 244/124
[51] Int. Cl.² ..................... B60F 3/00; B64C 35/00
[58] Field of Search ............... 244/124, 12 R, 23 R, 244/2, 13; 114/67 A, 66.5 R, 162; 180/115–117; 115/1 A, 1 C

[56] References Cited
UNITED STATES PATENTS

| | | | |
|---|---|---|---|
| 1,469,796 | 10/1923 | Lake | 114/67 A X |
| 2,377,143 | 5/1945 | Golden | 114/162 X |
| 2,707,084 | 4/1955 | Mills | 115/1 C X |
| 3,322,223 | 5/1967 | Bertelson | 244/12 R X |
| 3,400,904 | 9/1968 | Bede | 244/124 |
| 3,750,978 | 8/1973 | Cunningham | 244/2 |

FOREIGN PATENTS OR APPLICATIONS

| | | | |
|---|---|---|---|
| 332,898 | 2/1918 | Germany | 244/124 |
| 1,962,058 | 6/1971 | Germany | 244/12 R |

*Primary Examiner*—Trygve M. Blix
*Assistant Examiner*—Barry L. Kelmachter

[57] ABSTRACT

This invention relates to marine skimmer craft that is, watercraft of the kind that is only partially immersed and skims along the surface of the water under propulsion, the craft being supported at least partly by aerodynamic force produced by suitable support structure. According to this invention the support structure comprise wings located in at least two planes: each wing consists of at least two wing panels joinable by their mutually adjacent lateral edges whereby the number of wing panels actually used may be selected in dependence upon the desired lift characteristics and the desired position of the center of gravity of the craft as a whole. As an example, two wing panels may be arranged in one plane on either side of the craft and four wing panels in another plane above its stern.

4 Claims, 2 Drawing Figures

MARINE SKIMMER CRAFT

BACKGROUND OF THE INVENTION

The present invention relates to marine skimmer craft that is to say watercraft of the kind that is only partially immersed and skims along the surface of the water when propelled, being supported at least partly by aerodynamic force produced by suitable support means.

One object of the invention is to provide marine craft with support means whose configuration may be altered, and to allow such craft to be propelled by means of an air-screw so that they will be particularly stable when skimming and will travel at high speed through air and water.

Air-cushion vehicles in which force-fed air flows under the vehicle are already being used at sea, but the ground effect which they employ allows them to skim at only a limited height.

An aircraft-like ram-winged boat is also known, which has two heavily cambered, large span wings which generate lift in the slip-stream.

The use of air-cushion vehicles at sea is restricted by sea conditions which, if too rough, cause the propulsion system to make too much noise and to operate inefficiently. In the case of the ram-winged boat the large span of the wings is a hindrance when it moves about in port.

Another object of the invention is to provide a marine craft with support means whose configuration can be altered, which can move through air and water, and which is particularly stable in the skimming state.

SUMMARY OF THE INVENTION

This object is achieved in accordance with the invention by arranging wings on the craft in at least two planes and by forming the wings from wing panels which can be joined together at the sides. As an example, two wing panels may be arranged in one plane at either side of the craft and four wing panels in another plane above its stern, the arrangement selected being dependent upon the desired lift characteristics and the desired position for the centre of gravity of the craft as a whole. Two pivotable control-surfaces are preferably arranged in a horizontal plane on either side of the front of the craft and are used to control the height at which it skims. Beneath the front of the craft is situated a pivotable vertical control-surface for controlling the craft's direction of travel in the air or water. Two pivotable rear wheels and a pivotable and steerable nose wheel are secured to the craft to allow it to move on land. Behind the wing panels in the direction of movement is situated an air-screw most of which is enclosed to prevent accidents.

The advantages able to be achieved with the invention derive particularly from the fact that the support apparatus can be built up as desired from a selected number of wing panels and can be secured to the craft at different levels. Each wing panel is designed to provide a given amount of lift so that the stability of the craft and the height at which it skims can be easily adjusted by suitable choice of the number of wing panels. Wing panels of this type are economical to produce and cheap to replace if damaged. The provision of steerable road-wheels allows the craft to be moved or parked on land. A marine skimmer craft as presently embodied may be used and parked anywhere.

DESCRIPTION OF THE DRAWINGS

In order that the invention may be more clearly understood reference will now be made to the accompanying drawings which schematically show one embodiment thereof by way of example and in which.

DESCRIPTION OF A PREFERRED EMBODIMENT

Figure 1:
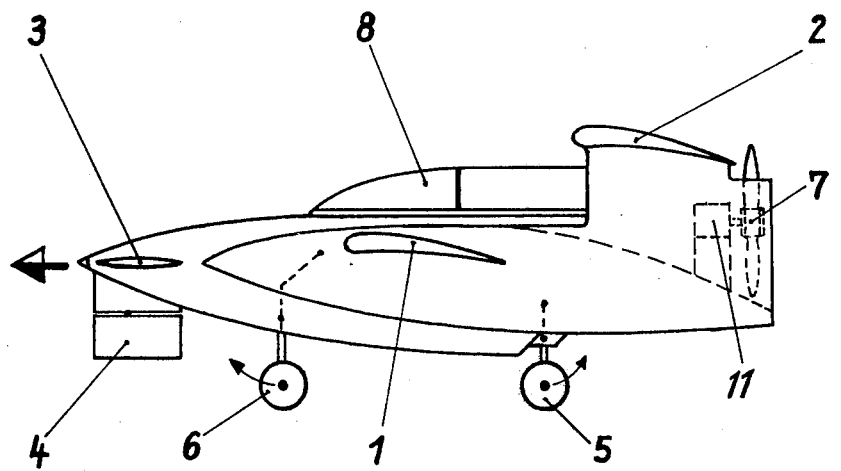
FIG. 1 shows a side view of an embodiment of marine skimmer craft.
Figure 2:
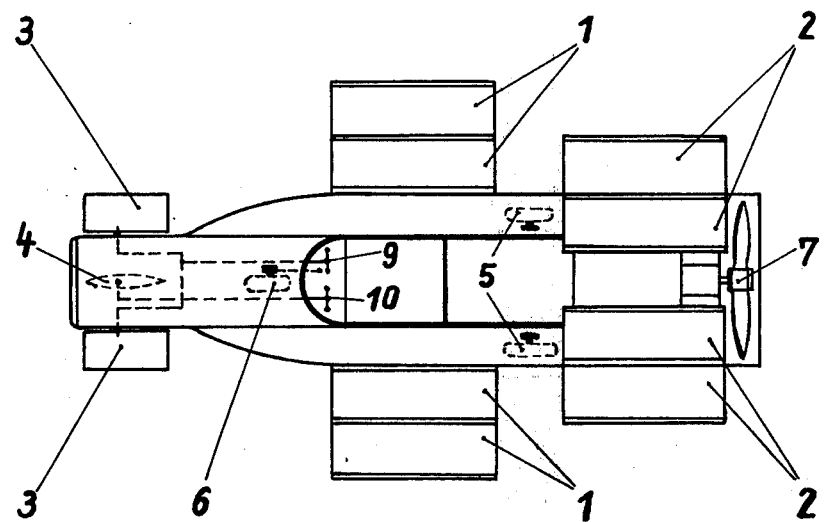
FIG. 2 shows a plan view of the craft shown in FIG. 1.

Referring now to the drawings, the support apparatus of the craft consists of four wing panels 1 and four wing panels 2 which are secured to the body of the craft in horizontal planes behind one another at different heights. At the front of the craft are situated two horizontal, pivotable control-surfaces 3 in lateral positions and a downwardly directed, pivotable, vertical control-surface 4 in a central position. Also fitted to the craft are two pivotable rear wheels 5 and a pivotable and steerable front wheel 6 (FIG. 1). Behind the wing panels 2 is situated an air-screw propulsion unit 7. The centre portion of the craft takes the form of a cabin 8 containing controls 9, 10 for the control-surfaces 3, 4 (FIG. 2).

The marine craft can be propelled by the air-screw propulsion unit 7, driven by any suitable prime mover schematically illustrated at 11, either through the water in the skimming condition or on land. For movement on land, the road wheels 5 and 6 are used, the front wheel 6 being formed as a steered wheel. The road wheels 5, 6 may be retracted when the craft is used on the water. The wing panels 1, 2 produce lift in the slip-stream and at a certain forward speed they raise the craft out of the water to a height at which it is skimming. Due to the fact that the wing panels 1, 2 are at different heights the craft is particularly stable when skimming.

The height to which the craft is raised is controlled from control 9 in cabin 8 by means of control-surfaces 3. Directional control in the air or water as it flows past is achieved by means of control surface 4 which can be pivoted by means of control 10 in cabin 8 which also serves to stabilise the craft directionally.

I claim:

1. A marine skimmer craft comprising an elongated body with anterior and posterior opposite ends thereof; a propulsion means for driving the body, mounted on said posterior end; at least two sets of wings mounted on the elongated body, each set having a wing extending laterally opposite from a remaining wing of the set extending in an opposite direction from an opposite side of the body, the wings of each set having upper and lower substantially flat surfaces positioned in substantially horizontal planes relative to the elongated body in a substantially horizontal plane, one set being mounted on the elongated body at an upper portion of the posterior end, a remaining other set being mounted substantially intermediately between said anterior and posterior opposite ends, in a different lower plane relative to said upper portion; and forward pivotable control-surface elements, one element mounted on each of opposite sides of the elongated body at said anterior end, each extending laterally in opposite directions from one-another each in a substantially horizontal plane laterally; and each wing comprising a plurality of panels elongated from front to back with each of lateral edges extending between the front and the back and being adapted for mating with a lateral edge of another panel, at least two panels for each wing being in a mated state.

2. A marine skimmer craft of claim 1, including at least three retractable wheel means for providing wheels for rolling on when on land and for retracting when skimming on water surface, mounted in positions to provide support for the elongated body to which they are attached.

3. A marine skimmer craft of claim 2, in which said propulsion means comprises a partially enclosed airscrew propulsion unit.

4. A marine skimmer craft of claim 3, in which one of said wheel means is about centrally located in juxtaposition to said interior end and in which a remaining two of said wheel means are laterally spaced from one-another located in juxtaposition to said posterior end, and including an upright pivotably mounted control element below said anterior end.

* * * * *